3,217,046
PROCESS FOR PRODUCING UNDECANEDIOIC ACID FROM PLANT SOURCES

Kenneth L. Mikolajczak, Washington, Ill., assignor to the United States of America as represented by the Secretary of Agriculture
No Drawing. Filed Nov. 27, 1962, Ser. No. 240,460
4 Claims. (Cl. 260—537)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to a commercially attractive process for preparing undecanedioic acid as well as nonanoic (pelargonic) acid and the corresponding methyl esters from previously completely unrecognized excellent plant sources of constituent cis-11-eicosenoic acid.

More particularly this invention relates to the preparation of advantageous yields especially of undecanedioic acid but also of nonanoic acid and their methyl esters by oxidatively cleaving cis-11-eicosenoic acid that we have found to exist in surprisingly large quantities in the seed oils of several particular species of plants.

Still more particularly our invention relates to the preparation of the aforesaid acids and their methyl esters by oxidatively cleaving the hitherto unsuspected large amounts of constituent cis-11-eicosenoic acid that I have discovered is present in the seed oils of two thusly unique members of the Cruciferae family, namely *Alyssum maritimum* (also known as *Lobularia maritima*) and in *Selenia grandis* and in the seed oil of an entirely unique member of the family Compositae, namely *Marshallia caespitosa*.

The cornerstone of the present invention, which could improve the agricultural economy of the United States is the unobvious discovery that the seed oil fatty acids of *Alyssum maritimum* comprise 41.8 percent of constituent cis-11-eicosenoic acid, those of *Selenia grandis* comprise 58.5 percent of constituent cis-11-eicosenoic acid, and those of *Marshallia caespitosa* comprise 43.9 percent of constituent cis-11-eicosenoic acid, thus establishing these heretofore obscure seed oils as some of the richest natural sources of cis-11-eicosenoic acid, which is a principal constituent of the costly liquid wax extracted from both domestic and imported *Simmondsia chinensis* (jojoba) seed, which liquid wax is used per se so that to date there has been no commercially available source of cis-11-eicosenoic acid.

Thus, *Marshallia caespitosa* seed oil is the only oil from the family Compositae so far found that contains more than a negligible 1 to 2 percent of constituent cis-11-eicosenoic acid. The Marshallia plant is a tufted perennial herb that is found from Missouri to Texas and is occasionally used for outdoor decorative plantings. *Selenia grandis* is a winter annual native to Texas but is not decorative and apparently has not been cultivated for any purpose. *Alyssum maritimum* (popularly called sweet alyssum) is a common low-spreading perennial that is grown as an ornamental in many rock gardens. Because the potential economic value of the aforesaid plants has not heretofore been recognized, none have been cultivated as an industrial crop.

Undecanedioic acid is known to have utility in the preparation of polyamides, polyesters, and polyanhydrides. Nonanoic acid has utility in the synthesis of plasticizers, and synthetic flavors, as a flotation agent, and in the form of its esters as a component of turbojet lubricants.

The principal object of this invention is the advantageous discovery of the presence of large amounts of an industrially attractive fatty acid constituent, namely cis-11-eicosenoic acid, in heretofore uncultivated or rarely cultivated plants. A related object is the preparation particularly of undecanedioic acid and also of nonanoic acid in industrially attractive quantities by oxidatively cleaving cis-11-eicosenoic acid per se or the methyl ester of cis-11-eicosenoic acid, each obtained from the seed oils of a plant selected from the group consisting of *Alyssum maritimum, Selenia grandis,* and *Marshallia caespitosa.* Other and related objects will be apparent in the following detailed specification and appended claims.

As part of an extensive program to discover seed oils having potential industrial value, we respectively Soxhlet-extracted ground seeds of *Alyssum maritimum, Selenia grandis,* and *Marshallia caespitosa* with petroleum ether (B.P. 30–60° C.) and removed the solvent in a rotary evaporator to obtain the seed oils in respective yields of 31.3 percent, 18.3 percent, and 22.8 percent.

The surprising fatty acid compositions of the three said seed oils were discovered in the following manner. Each seed oil was either directly transesterified with methanol containing 1 percent sulfuric acid or the oil was first saponified, the saponification mixture acidified, and the mixed fatty acids were extracted with ethyl ether and methylated using acid catalysts. The esters were then fractionated by distilling through a spinning band column to give the results shown in Table I. Gas liquid chromatographic analysis of total esters from the original oils and of certain combined methyl ester distillate fractions are shown in Table II.

Highly pure specimens of cis-11-eicosenoic acid were obtained for melting point determinations (Lit. values 21° C. and 23–24° C.; found 21.0–22.5° C.) by saponifying highly pure methyl ester fractions and recrystallizing the cis-11-eicosenoic acid three times from redistilled acetone at −18° C. Infrared spectral analysis of the methyl esters showed the absence of trans double bonds.

In view of the above findings we then subjected the highly pure ester distillate fraction rich in cis-11-eicosenoic acid constituent from each of the oils to permanganate-periodate oxidation in 60 percent tertiary butyl alcohol at ambient temperature for 17 hours (von Rudloff, Can. J. Chem., 34, 1413 (1956)) to form mixtures consisting essentially of nonanoic (pelargonic) acid and the methyl half ester of undecanedioic acid. A portion of each oxidation mixture was esterified by reaction with methanol containing boron trifluoride as catalyst and the methyl esters analyzed by gas-liquid chromatography with the results shown in Table III.

The following examples are presented to more fully show the process of my invention.

It will be understood that the following exemplary separation of cis-11-eicosenoic acid as its methyl ester through fractional distillation of methyl esters prepared from the glyceride oils, and particularly the use of permanganate-periodate oxidation to effect cleavage of the methyl cis-11-eicosenoate were dictated by analytical considerations. Industrially, one would simply fractionally distill the desired cis-11-eicosenoic acid from the mixed acids obtained from the respective oils by saponification, and then the resulting cis-11-eicosenoic acid would be cleaved by ozonolysis to obtain the desired nonanoic acid and undecanedioic acids.

EXAMPLE 1

Isolation of cis-11-eicosenoic acid from Marshallia seed.

Ground Marshallia seed (52.6 g.) was Soxhlet-extracted overnight with petroleum ether (B.P. 30–60° C.). The solvent was removed in vacuo with a rotary evaporator, yielding 11.99 g. of Marshallia seed oil. A portion of the oil (8.90 g.) was saponified by refluxing with 1 N ethanolic potassium hydroxide under nitrogen for 1½ hours. The saponification mixture was extracted with ethyl ether, yielding 0.48 g. of unsaponifiable material. The alkaline liquor was acidified and re-extracted with ethyl ether, yielding 7.70 g. of mixed fatty acids. A large aliquot of the mixed fatty acids (6.8 g.) was esterified by refluxing for 2 hours with methanol containing 1 percent sulfuric acid; 6.4 g. of mixed methyl esters (94.1 percent yield) was obtained.

The mixed methyl esters were fractionally distilled through a spinning band column. Distillation conditions and the weights of collected fractions are shown in Table I. The vacuum in the spinning band apparatus was released each time a fraction was removed from the collector, but the column was operated at total reflux for some time before each collection. The head temperatures given in Table I were obtained at total reflux and at the end of the collection. GLC analysis of selected fractions showed that fractions 9, 10, and 11 were substantially pure and could be combined for identification. Accordingly, a 0.13 g. portion of combined fractions 9–11 was saponified, acidified, and then extracted with ethyl ether. Upon removal of the solvent there remained 0.12 g. of a viscous colorless liquid. After three recrystallizations from freshly redistilled acetone at −18° C., cis-11-eicosenoic acid melting at 21.0–22.5° C. was obtained.

EXAMPLE 2

Oxidative cleavage of cis-11-eicosonoic acid from Marshallia.

A 0.13 g. portion of the combined distillate fraction of Example 1 was subjected to permanganate-periodate oxidation in 60 percent tertiary butyl alcohol at room temperature for 17 hours. The oxidation mixture was freed of residual oxidant ions by their reduction with sodium metabisulfite, then made strongly alkaline to saponify all components during the rotary evaporator removal of alcohol at 50° C., acidified to convert the soaps to the free fatty acids, the latter extracted with ethyl ether, and the ether evaporated to yield 0.16 g. of semisolid material.

A portion of the semisolid oxidation material was esterified by reaction with methanol containing boron trifluoride, and the esters analyzed by gas-liquid chromatography to give the values shown in Table III.

The remainder of the oxidation material was triturated with petroleum ether (B.P. 30–60° C.). The portion not extracted (crude undecanedioic acid) was a white solid, M.P. 87–91° C. After three recrystallizations at −5° C. from petroleum ether containing about 2 percent methanol, highly pure undecanedioic acid having a M.P. of 109–110.5° C. was obtained (lit. M.P. 109–110° C.).

EXAMPLE 3

Preparation of cis-11-eicosenoic acid from Alyssum.

Ground seeds of *Alyssum maritimum* were petroleum ether extracted by the procedure of Example 1, and the oil obtained in a yield of 31.3 percent. The methyl esters were prepared by transesterification and fractionated. GLC analysis of the fractions are shown in Table II. Fractions 8, 9, and 10 were combined and a 0.15 g. portion of the combined fractions was saponified, yielding 0.13 g. of an acid showing no trans absorption on infrared analysis. After two recrystallizations from absolute ethanol (solid discarded) and two recrystallizations from redistilled acetone at −18° C., the highly pure cis-11-eicosenoic acid obtained was found to have a M.P. of 21.5–22.0° C. On admixture with the same acid obtained in Example 1 there was no depression of the melting point.

EXAMPLE 4

Oxidation of cis-11-eicosenoic acid from Alyssum.

An 0.12 g. portion of the combined distillate fraction of Example 3 was oxidized by the procedure of Example 2 and 0.1 g. of mixed acids recovered. A boron trifluoride-catalyzed methyl ester preparation of the oxidation products had the GLC composition shown in Table III. The remaining oxidation product material was triturated with petroleum ether. The insoluble portion (crude undecanedioic acid) was recrystallized twice at −5° C. from petroleum ether containing 2 percent methanol. It melted at 110.0–111.0° C., and a mixture of this acid with the same acid from Example 2 had a M.P. of 109.5–110.5° C.

EXAMPLE 5

Ground seed of *Selenia grandis* were extracted as in Example 1 to yield 18.3 percent of oil which was saponified, acidified, extracted, and esterified. The esters were fractionated, and fractions 2, 3, and 4 of Table I were combined after GLC analyses. A 0.21 g. portion of the combined distillate was saponified and yielded 0.20 g. of cis-11-eicosenoic acid that melted at 21.6–22.0° C. following three recrystallizations from the redistilled acetone at −18° C.

*Table I*
DISTILLATION OF MIXED METHYL ESTERS

| Fraction | Marshallia caespitosa | | | Alyssum maritimum | | | Selenia grandis | | |
| --- | --- | --- | --- | --- | --- | --- | --- | --- | --- |
| | Head temp., C. | Press., mm. Hg | Wt., g. | Head temp., C. | Press., mm. Hg | Wt., g. | Head temp., C. | Press., mm. Hg | Wt., g. |
| 1 | 131–135 | 0.35 | 1.630 | 142 | 0.90 | 0.300 | 130–136 | 0.30 | 2.085 |
| 2 | 135 | 0.35 | 0.750 | 142–145 | 0.70 | 0.525 | 136–141 | 0.30 | 0.960 |
| 3 | 135–137 | 0.30 | 0.180 | 140–142 | 0.50 | 0.640 | 142 | 0.30 | 0.510 |
| 4 | 138–140 | 0.30 | 0.200 | 141 | 0.40 | 0.570 | 142–143 | 0.30 | 0.370 |
| 5 | 140–141 | 0.30 | 0.190 | 140–142 | 0.35 | 0.990 | 143–144 | 0.30 | 0.450 |
| 6 | 141–142 | 0.30 | 0.140 | 142–144 | 0.30 | 0.430 | 154 | ᵃ 0.50 | 0.540 |
| 7 | 143–144 | 0.30 | 0.150 | 145–149 | 0.30 | 0.490 | 154–156 | 0.60 | 0.900 |
| 8 | 144 | 0.30 | 0.410 | 149–150 | 0.25 | 0.530 | 156–160 | 0.70 | 0.820 |
| 9 | 144 | 0.30 | 0.370 | 150–151 | 0.25 | 0.480 | 160–165 | 0.70 | 0.460 |
| 10 | 144–145 | 0.30 | 0.230 | 151 | 0.25 | 0.570 | | | |
| 11 | 145–147 | 0.30 | 0.225 | 151–153 | 0.25 | 0.520 | | | |
| 12 | 147–148 | 0.20 | 0.440 | 153–155 | 0.25 | 0.260 | | | |
| 13 | 148–153 | 0.20 | 0.470 | 155–162 | 0.25 | 0.370 | | | |
| 14 | 153–157 | 0.20 | 0.650 | 162–163 | 0.25 | 0.560 | | | |

ᵃ Pot and heating mantle changed.

Table II
GLC ANALYSES OF ORIGINAL OILS AND COMBINED DISTILLATE FRACTIONS
[Area percent of methyl ester in mixed methyl esters]

| Acid | Marshallia caespitosa | | Alyssum maritimum | | Selenia grandis | |
|---|---|---|---|---|---|---|
| | Original oil | Combined fract. 9, 10, and 11 | Original oil | Combined frac. 8, 9, and 10 | Original oil | Combined fract. 2, 3, and 4 |
| Tetradecanoic | 0.1 | ------ | Trace | ------ | ------ | ------ |
| Hexadecanoic | 3.3 | 0.1 | 3.9 | Trace | 2.2 | 0.1 |
| Hexadecenoic | 0.2 | ------ | Trace | ------ | 0.3 | ------ |
| Octadecanoic | 1.7 | Trace | 5.8 | 0.7 | 1.3 | Trace |
| Octadecenoic | 16.7 | 1.9 | 30.2 | 3.3 | 28.2 | 3.9 |
| Octadecadienoic | 31.9 | Trace | 6.7 | 0.7 | 4.3 | 0.4 |
| Octadecatrienoic | 0.3 | ------ | 10.2 | ------ | 1.9 | ------ |
| Eicosanoic | 0.4 | 0.3 | 0.6 | 3.6 | Trace | 0.2 |
| Eicosenoic | 43.9 | 95.9 | 41.8 | 91.6 | 58.5 | 92.6 |
| Eicosadienoic | 1.5 | ------ | 0.3 | ------ | ------ | ------ |
| Docosanoic | ------ | ------ | 0.5 | ------ | Trace | 0.6 |
| Docosenoic | ------ | a 1.8 | ------ | ------ | 3.3 | 2.2 | a From methyl erucate chaser.

Table III
GLC ANALYSES OF OXIDATION PRODUCTS
[Area percent of methyl ester in mixed methyl esters]

| Acid | Marshallia caespitosa | Alyssum maritimum | Selenia grandis |
|---|---|---|---|
| Nonanoic | 41.8 | 29.5 | 38.4 |
| Octanedioic | ------ | 0.1 | 0.3 |
| Nonanedioic | ------ | 2.8 | 3.4 |
| Decanedioic | 1.3 | 0.5 | 0.5 |
| Undecanedioic | Trace | ------ | ------ |
| Tridecanedioic | 56.2 | 62.9 | 56.0 |
| Hexadecanoic | Trace | ------ | 1.4 |
| Octadecanoic | ------ | 0.2 | ------ |
| Eicosanoic | ------ | Trace | ------ |
| | 0.6 | 4.1 | ------ |

Having fully disclosed my invention, I claim:

1. Method of obtaining undecanedioic acid comprising the steps of:
   (a) extracting the ground seed of a plant selected from the group consisting of *Marshallia caespitosa*, *Alyssum maritimum*, and *Selenia grandis* with petroleum ether to obtain a triglyceride oil containing over 40 percent of constituent cis-11-eicosenoic acid;
   (b) transesterifying the recovered triglyceride oil with methanol to produce a mixture comprising the methyl ester of cis-11-eicosenoic acid;
   (c) fractionally distilling the said mixture to isolate the methyl ester of cis-11-eicosenoic acid;
   (d) oxidatively cleaving the methyl ester of cis-11-eicosenoic acid by means of a permanganate-peroxide oxidizing agent to form a mixture comprising nonanoic acid and the methyl ester of undecanedioic acid;
   (e) saponifying the oxidation mixture;
   (f) extracting the saponified mixture with petroleum ether to separate crude undecanedioic acid therefrom;
   (g) subjecting the crude undecanedioic acid to recrystallization at $-5°$ C. from the petroleum ether containing about 2 percent methanol.

2. Method of claim 1 wherein the ground seed is that of *Marshallia caespitosa*.

3. Method of claim 1 wherein the ground seed is that of *Alyssum maritimum*.

4. Method of claim 1 wherein the ground seed is that of *Selenia grandis*.

No references cited.

CHARLES B. PARKER, *Primary Examiner.*

IRVING MARCUS, *Examiner.*